J. V. PRIEST.
LOOSE TREAD TRACTION WHEEL.
APPLICATION FILED OCT. 24, 1916.
1,378,131.
Patented May 17, 1921.
2 SHEETS—SHEET 2.
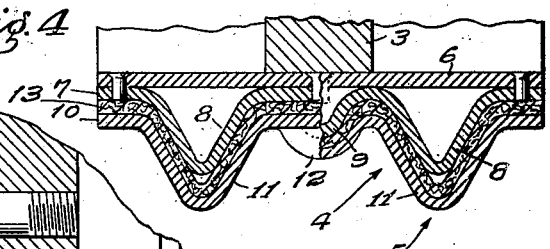
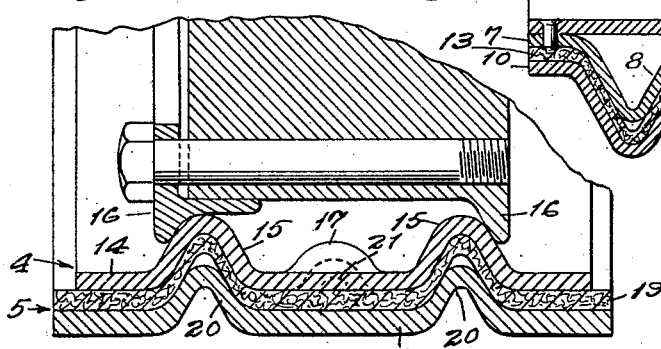
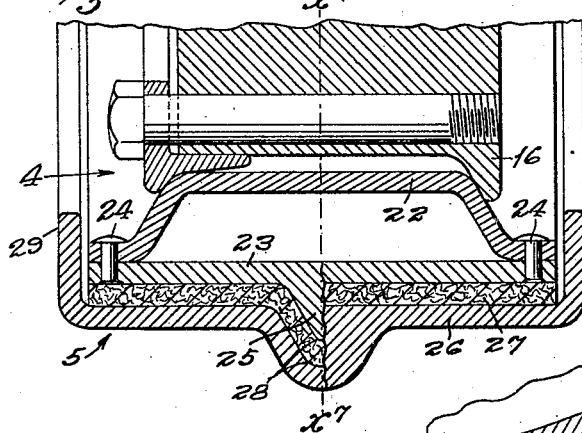
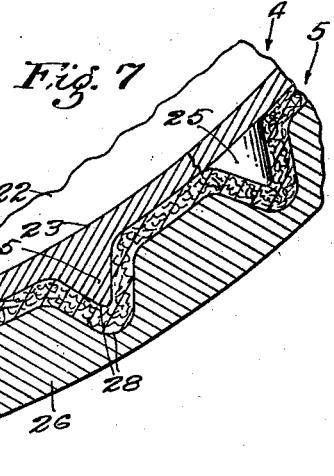
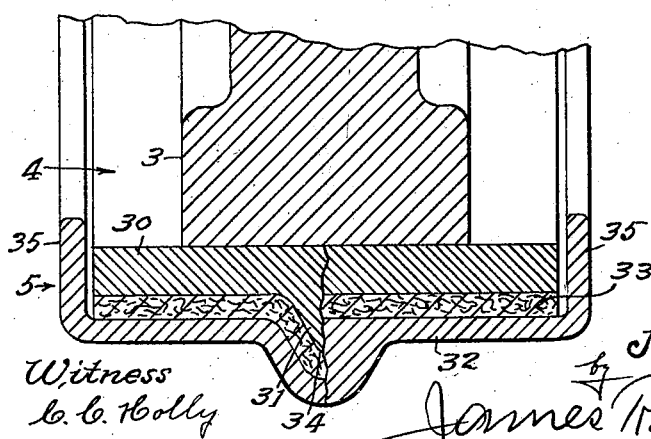
Inventor
James V. Priest
by
James R. Townsend
his atty.
Witness
C. C. Holly

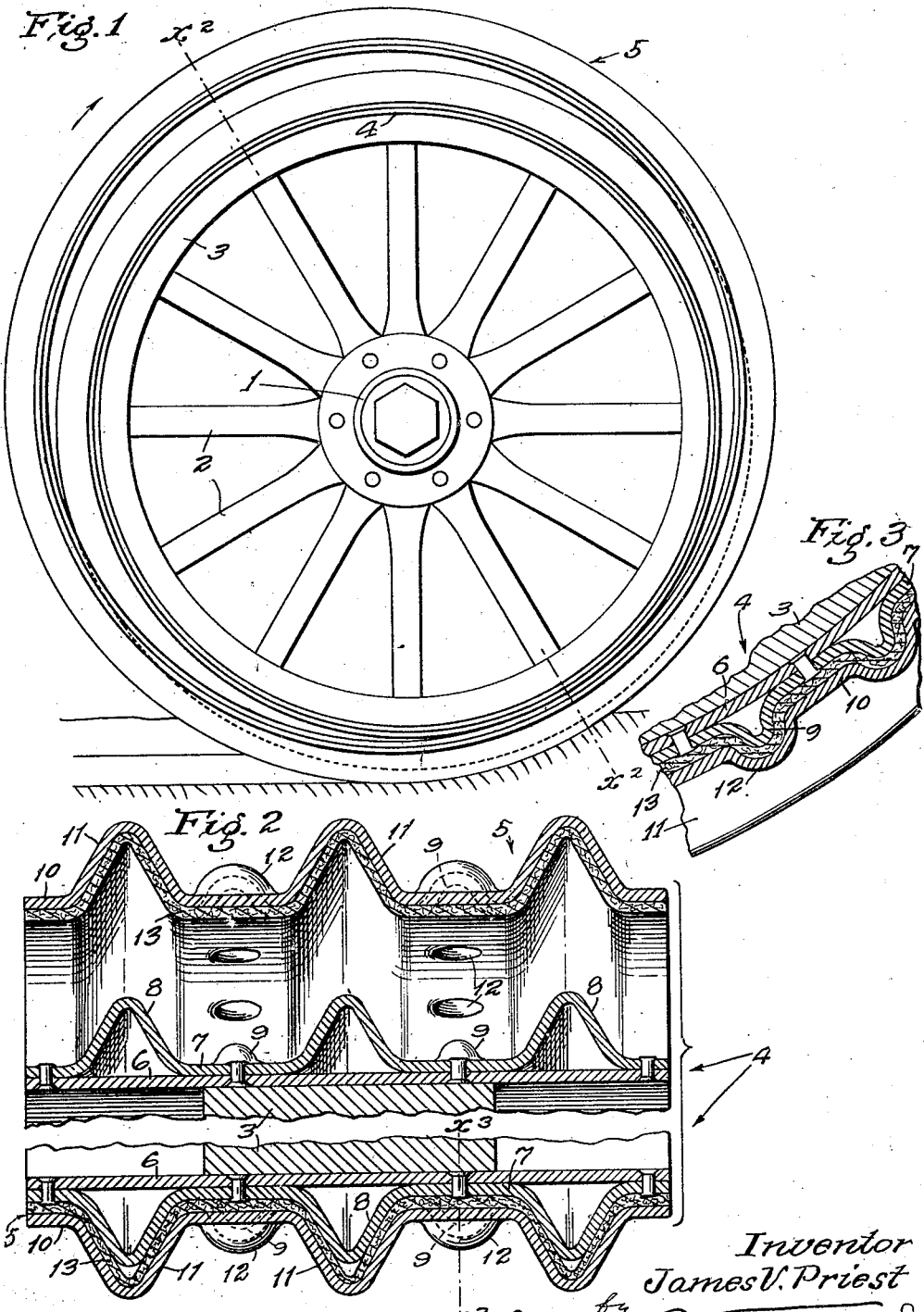

UNITED STATES PATENT OFFICE.

JAMES V. PRIEST, OF LOS ANGELES, CALIFORNIA.

LOOSE-TREAD TRACTION-WHEEL.

1,378,131.      Specification of Letters Patent.     Patented May 17, 1921.

Application filed October 24, 1916. Serial No. 127,346.

*To all whom it may concern:*

Be it known that I, JAMES V. PRIEST, a citizen of the United States, residing at Los Angeles, in the county of Los Angeles and State of California, have invented a new and useful Loose-Tread Traction-Wheel, of which the following is a specification.

An object of this invention is to produce improved means for enabling automobiles and the like to pass readily over the sand of the desert and over other soft ground; and the invention provides an improvement in automatically movable tracks for the wheels of a vehicle to run upon while practically climbing out of the depressions made by the wheels.

That is to say, by this invention improved means are provided whereby the center of the wheel is raised and advanced so that the wheel will more easily climb out of a depression and whereby a continuous climbing under continuous running in sandy or other soft ground is effected in a more satisfactory manner than heretofore.

One feature of the invention consists in the provision on a wheel of a fixed peripherally corrugated rim and around such wheel of a peripherally corrugated, loose annular tread; the corrugations of the rim and tread registering transversely of the wheel and being wedge shaped so as to maximize the frictional resistance to circumferential slippage between the two surfaces and to prevent lateral slip between such surfaces; there being also at times, the addition of teeth and recesses therefor to positively prevent relative rotation of the wheel body and loose tread.

The accompanying drawings illustrate the invention.

Figure 1 is a side elevation of a loose tread traction wheel embodying the principles of my invention.

Fig. 2 is an enlarged cross section at the elevated contact place of the rim of the wheel when running in sand, and showing three circumferential outwardly projecting anti-skidding corrugations upon the loose tread track, corresponding corrugations upon the wheel rim to prevent lateral slipping of the wheel upon the loose tread track, and gear teeth to absolutely prevent circumferential slipping of the fixed wheel on the loose tread track.

Fig. 3 is a sectional detail on the line $x^3$ of Fig. 2.

Fig. 4 is a view analogous to Fig. 2, but showing a narrower rim with two anti-skidding corrugations instead of three.

Fig. 5 is a view analogous to Fig. 4 and showing the corrugations and gear teeth extending inwardly, and showing one way of attaching to the stock rim of a truck wheel.

Fig. 6 is a view analogous to Figs. 4 and 5 and showing a single outwardly extending anti-skidding corrugation, the gear teeth being in line with the corrugation.

Fig. 7 is a sectional detail on line $x^7$, Fig. 6.

Fig. 8 is a view analogous to Fig. 6 and showing a different form of attachment to the wheel.

A loose tread traction wheel embodying the principles of my invention comprises the combination with a wheel body, which may comprise a hub 1, spokes 2 and a felly 3, or any substitute therefor, of a rigid attaching rim 4 secured to the body rim or felly 3 and a loose tread track rim 5 upon which the attaching rim 4 runs.

The details of the hub, spoke and felly construction are not material, as I propose to use any wheel for which there is a demand.

Referring to Figs. 2 and 3, the plain flat metal tire band 6 is set upon the felly 3, said band being of any desired width for a sand rim, the construction shown being for a heavy truck. The guide and gripping band 7 is set upon the tire band 6. If the felly 3 has a suitable peripheral face the tire band 6 may be omitted and the guide and gripping band 7 set directly upon the felly. The guide and gripping band 7 has three parallel outwardly projecting circumferential anti-skidding track guiding and retaining corrugations 8 and two rows of outwardly projecting gear teeth 9, said corrugations 8 and gear teeth 9 being formed by pressing.

The loose tread track rim 5 has a metal band 10, similar to the band 7, and is provided with anti-skidding, track guiding and retaining corrugations 11 in which the corrugations 8 fit and run and gear teeth recesses 12 in which the gear teeth 9 fit and run, so that the track will not slip laterally from under the wheel and so that the wheel will not slip circumferentially upon the track. The lining 13 of hard fiber is set within the band 10 and makes a non-metallic contact between the wheel and track, thereby minimizing wear and noise.

On account of its non-slipping character the lining also maximizes friction and thus causes a positive contact between the wheel and the track, thereby relieving the strain upon the gear teeth and assisting the corrugations and the gear teeth in preventing circumferential slipping of the wheel upon the track.

The loose tread track rim 5 has a minimum internal diameter greater than the maximum external diameter of the attaching rim 4 so that the track rim may be readily inserted or removed when the wheel is off the ground; and when the load is on the wheel, the track rim is held in place as before suggested; thereby providing an automatically movable track for the wheel to run on.

Referring to Fig. 4, I have shown a construction for a lighter truck, there being narrower bands having one row of gear teeth and two rows of anti-skidding guiding and retaining corrugations.

Referring to Fig. 5 the rigid attaching rim 4 comprises the guide and gripping band 14 having two parallel inwardly projecting circumferential anti-skidding track guiding and retaining corrugations 15 fitting the quick detachable tire rim 16, and having a row of inwardly extending gear teeth recesses 17. The loose tread track rim 5 comprises the metal band 18 and the lining 19 having the inwardly projecting corrugations 20 fitting and running in the corrugations 15 and having the inwardly projecting gear teeth 21 running in the recesses 17. This is one form of applying my invention to wheels intended for solid rubber or pneumatic tires, so that loose and tight treads may be interchangeable.

Referring to Figs. 6 and 7, the rigid attaching rim 4 comprises the supplemental tire band 22 circumferentially offset inwardly from its edges to fit the quick detachable tire rim 16 and the guide gripping band 23 secured to the edges of the supplemental band by rivets 24, said guide and gripping band 23 having a single row of outwardly extending gear teeth 25. The loose tread track rim 5 comprises the metal band 26 and the lining 27 having gear teeth recesses 28 in which the gear teeth 25 run and having retaining flanges 29 extending from the edges of the band 26 inwardly past the edges of the band 23.

Referring to Fig. 8 the rigid attaching rim 4 comprises the flat tire band 30 set upon the felly 3 and having a row of gear teeth 31 projecting outwardly circumferentially. The loose tread track rim 5 comprises the metal band 32 and the lining 33 having the gear teeth recesses 34 in which the gear teeth 31 run, and having the retaining flanges 35 extending inwardly from the edges of the band 32 past the edges of the band 30, so as to hold the wheel upon the track under the load.

It is obvious that the details of construction may be varied in many other ways without departing from the spirit of my invention as set up in the following claims and that the friction between the loose tread and the inner wheel rim or felly is highly effective irrespective of the teeth and recesses therefor so that in many instances the teeth and recesses could be omitted and practical improvement over the prior art be still maintained.

I wish to call especial attention to the deep wedge-shaped circumferential corrugations, which greatly increase the frictional surface of a given width. This increased frictional surface is important in its contact with the sand and it is important in the contact between the attaching rim and the loose tread track rim. Among other things it reduces the wear and above all it reduces the tendency to slip or spin, as the corrugations on account of their wedge shape are at all times during the travel of the wheel forced into a practically non-slipping engagement with each other by the weight of the wheel plus the weight of the load it carries, and it is evident that such a strong frictional grip cannot be attained by other forms of corrugations, or by circumferential ridges adapted to engage grooves of other forms. It is also clear that while the flat portions at the sides of the corrugations will rest upon the loose surface sand, the corrugations shown in Figs. 2, 3, 4, 6, 7 and 8, will penetrate to the more solid sand and press the sand laterally under the flat portions and at the same time these circumferential corrugations will meet but trifling resistance in their forward rolling motion as compared with the usual cross ribs. In the modified form of the wheel rim, shown in Fig. 5, the flat portions of the rim press the sand laterally and into the corrugations 20, so that thereby ridges are formed which effectually prevent lateral movement of the wheel during its travel upon the ground.

In a case where the wheel is carrying a load over soft sand as in Fig. 1 the center of the solid wheel is always somewhat below and in front of the center of the loose tread track rim and the wheel is climbing the track rim as it would climb a board laid upon the sand and the load will move much easier than if the track rim were removed.

I claim:—

1. The combination with a wheel body having a quick detachable tire rim, of a supplemental tire band fitting the quick detachable tire rim, a guiding and gripping band rigidly secured to the supplemental tire band, and a loose tread track rim in which the guiding and gripping band runs, there being wedge-shaped circumferential corrugations on the guiding and gripping band and corresponding wedge-shaped corrugations on the track rim to hold the wheel in the track rim and to prevent skidding, and there being gear teeth to hold the gripping band from slipping circumferentially in the track rim, the wedge-shaped corrugations relieving the strain upon the gear teeth and assisting them in preventing circumferential slipping.

2. A wheel having a flat rim; wedge shaped gear teeth on the periphery of said rim; a loose tread track rim in which the wheel runs, said track rim having recesses to receive the gear teeth and prevent slipping; and means between the flat rim and the track rim for maximizing friction between the wheel and the track rim and thereby relieving the strain upon the gear teeth and also for minimizing wear and noise.

3. A wheel, an attaching rim secured to the wheel and having a wedge-shaped circumferential corrugation, a loose tread track rim in which the wheel runs, said track rim having a corrugation fitting the corrugation of the attaching rim, so as to hold the attaching rim from slipping laterally in the track rim and so as to hold the track rim from skidding.

4. A wheel, an attaching rim secured to the wheel and having a wedge-shaped circumferential corrugation, a loose tread track rim in which the wheel runs, said track rim having a corrugation fitting the corrugation of the attaching rim, so as to hold the attaching rim from slipping laterally in the track rim and so as to hold the track rim from skidding, gear teeth connecting the track rim to the attaching rim to prevent circumferential slipping; and means between the attaching rim and the track rim for maximizing friction between the wheel and the track rim and thereby relieving the strain upon the gear teeth and also for minimizing wear and noise.

In testimony whereof I have hereunto set my hand at Los Angeles, California, this 13th day of September, 1916.

JAMES V. PRIEST.

Witness:
JAMES R. TOWNSEND.